B. DARROW.
VEHICLE WHEEL RIM.
APPLICATION FILED FEB. 12, 1914.
1,166,972.  Patented Jan. 4, 1916.
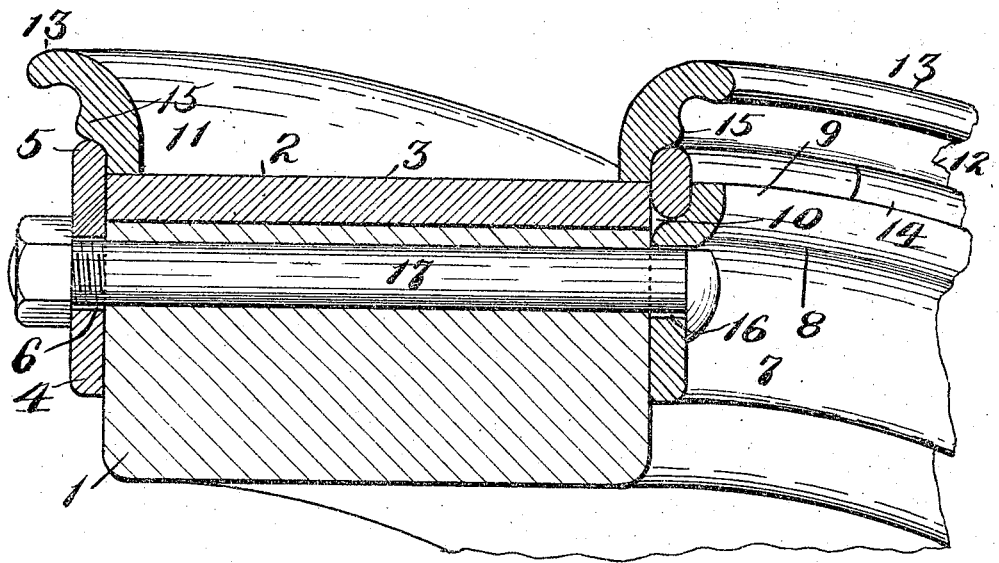
Witnesses
Jas L. Bitter
G. L. McClintock
Inventor
BURGESS DARROW.
By C. E. Humphrey
Attorney

UNITED STATES PATENT OFFICE.

BURGESS DARROW, OF AKRON, OHIO, ASSIGNOR TO THE GOODYEAR TIRE AND RUBBER COMPANY, OF AKRON, OHIO, A CORPORATION OF OHIO.

VEHICLE-WHEEL RIM.

1,166,972.

Specification of Letters Patent.

Patented Jan. 4, 1916.

Application filed February 12, 1914. Serial No. 818,248.

*To all whom it may concern:*

Be it known that I, BURGESS DARROW, a citizen of the United States, residing at Akron, in the county of Summit and State of Ohio, have invented new and useful Improvements in Vehicle-Wheel Rims, of which the following is a specification.

This invention relates to vehicle wheel rims used for holding elastic tires thereon.

Briefly, as a result of an effort made to standardize wheels for motor vehicles, a standard wheel embodying a felly and a felly-band are now produced by the wheel manufactured and these wheels are made to conform to different standard measurements, and the object of the invention is to utilize a portion of this standard equipment, to-wit:—the felly-band, as a portion of the tire-carrying rim, and to supplement this with devices for detachably holding an elastic tire thereon.

By utilizing the felly-band as a portion of the tire-carrying rim, the additional weight of a supplemental rim as now constructed, is obviated.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the matter hereinafter claimed.

In the drawing, the view presented shows the rim portion of a vehicle wheel and the tire-holding accessories partially in section and partially in perspective.

Referring to the drawing the reference numeral 1 denotes the felly, and 2 the felly-band of a standardized wheel. The outer face 3 of the felly-band constitutes a seat for an elastic tire. Applied to one side edge of the felly is a ring 4, the outer edge 5 of which projects outwardly beyond the outer face 3 of the band and constitutes an abutment for a purpose to be later described. The ring is provided with a circumferentially-extending series of transverse openings 6. Applied to the opposite face of the wheel is a ring 7 the outer face of which is offset at 8 so that the outer edge 9 thereof lies opposite to, but out of contact with, the side edge of the felly-band 2 to thereby provide a longitudinally-extending channel 10. It is contemplated that the outer face 9 will be approximately flush with the seat 3 of the felly-band 2. Mounted on the seat 3 are a pair of similarly and annularly-formed tire-retaining rings 11 and 12 having internal diameters sufficient to permit them to slide freely over the seat 3 and with their outer portions provided with hook-shaped edges 13. The tire-retaining member 11 in practice will be passed laterally across the seat 3 and is held against lateral movement by the abutment 5 and with its rounded face turned inwardly toward an elastic tire mounted on the seat 3. The tire-retaining member 12 is held from lateral movement by means of a split annularly-formed locking ring 14 which is sprung over the outer edge 9 of the ring 7 to seat in the channel 10 and constitute a detachable abutment for preventing lateral movement of the member 12, and at the same time, as the members 11 and 12 are provided with medially-placed beads 15 the bead on the member 12 overhangs the locking ring 14 and serves to lock it against movement.

It will be apparent that the two tire-retaining members 11 and 12, as placed in the drawings are adapted for holding what is known as a straight-side or inextensible selvage type of tire, but it will be apparent that by removing these rings from the seat and reversing their position to cause their hook-shaped edge to be turned toward each other, they will engage an ordinary clencher type of tire on the seat 3, but as this type of tire-ring is well known in the art it is thought a further description thereof is unnecessary.

The ring 7 is provided with a circumferentially-extending series of openings 16 complemental to the openings 6 in the ring 4, and the two rings are held in position on the felly through the medium of bolts 17 placed through these registering openings and through suitable openings formed in the felly itself.

I claim:—

A wheel rim comprising in combination with a felly, a felly-band seated on the periphery of the felly, a side ring on one side of the felly having its outer edge projecting beyond the felly-band to form an abutment, a side ring on the opposite side of the felly also having its outer edge projecting beyond the felly and said projecting portion laterally offset from the felly band to provide a channel between the offset portion of the ring and the adjacent edge of the felly-band, the outer edge of said offset portion being substantially flush with the outer face of the felly-band, a split locking ring seated in said channel and of a width to form an abutment, and tire holding elements loosely seated upon the felly-band and engaging said abutments formed by the locking ring and side ring respectively.

In testimony whereof I have hereunto set my hand in presence of two subscribing witnesses.

BURGESS DARROW.

Witnesses:
R. M. LEIMEN,
A. J. GILHOOLY.